US012793733B2

(12) United States Patent
Chen et al.

(10) Patent No.: US 12,793,733 B2
(45) Date of Patent: Nov. 10, 2026

(54) DUAL-SPIN TORQUE OSCILLATOR DESIGNS IN MICROWAVE ASSISTED MAGNETIC RECORDING

(71) Applicant: Headway Technologies, Inc., Milpitas, CA (US)

(72) Inventors: Wenyu Chen, San Jose, CA (US); Zhenyao Tang, Chiba (JP); Shohei Kawasaki, Sunnyvale, CA (US); Tetsuya Roppongi, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 19/323,674

(22) Filed: Sep. 9, 2025

(65) Prior Publication Data

US 2026/0011344 A1 Jan. 8, 2026

Related U.S. Application Data

(63) Continuation of application No. 17/872,831, filed on Jul. 25, 2022, now Pat. No. 12,451,156.

(51) Int. Cl.

| | |
|---|---|
| ***G11B 5/11*** | (2006.01) |
| ***G11B 5/187*** | (2006.01) |
| *G11B 5/00* | (2006.01) |

(52) U.S. Cl.

CPC ................ *G11B 5/11* (2013.01); *G11B 5/187* (2013.01); *G11B 2005/0024* (2013.01)

(58) Field of Classification Search

None

See application file for complete search history.

(56) References Cited

U.S. PATENT DOCUMENTS

| | | | | |
|---|---|---|---|---|
| 6,785,092 | B2 | 8/2004 | Covington et al. | |
| 8,264,799 | B2 | 9/2012 | Akiyama et al. | |
| 8,274,811 | B2 * | 9/2012 | Zhang .................. | H03B 15/006 427/127 |
| 8,654,480 | B2 | 2/2014 | Shimizu et al. | |
| 10,937,450 | B1 | 3/2021 | Kawasaki et al. | |
| 11,138,994 | B2 | 10/2021 | Nagasawa et al. | |
| 11,211,083 | B1 * | 12/2021 | Zheng .................... | G11B 5/315 |
| 12,451,156 | B2 | 10/2025 | Chen et al. | |
| 2012/0126905 | A1 | 5/2012 | Zhang et al. | |
| 2013/0063840 | A1 | 3/2013 | Koui et al. | |

(Continued)

OTHER PUBLICATIONS

Nakagawa et al., "Multiple Spin Injection Into Coupled Field Generation Layers for Low Current Operation of MAMR Heads," Aug. 2022; IEEE Transactions on Magnetics (vol. 58, Issue: 8, 2022, pp. 1-5) (Year: 2022).*

(Continued)

*Primary Examiner* — William J Klimowicz

(74) *Attorney, Agent, or Firm* — DLA Piper LLP (US)

(57) ABSTRACT

The present embodiments relate to write heads implementing microwave-assisted magnetic recording utilizing multiple spin torque oscillators (STOs). Each STO can include a field-generation layer (FGL) that can oscillate in a same frequency and out of phase with one another. The layers in each STO can enable mutual spin transfer torques between adjacent layers, which can drive the FGLs into a large angle oscillation. The oscillation between the FGLs can cause a magnetic field to be generated that can assist in writing to a magnetic recording medium.

20 Claims, 11 Drawing Sheets

(56) References Cited

U.S. PATENT DOCUMENTS

| | | | |
|---|---|---|---|
| 2013/0070367 A1 | 3/2013 | Igarashi et al. |
| 2013/0120875 A1 | 5/2013 | Suto et al. |
| 2013/0271866 A1 | 10/2013 | Sato |
| 2014/0177101 A1 | 6/2014 | Koui et al. |
| 2016/0218728 A1 | 7/2016 | Zhu |
| 2018/0075868 A1 | 3/2018 | Koui et al. |

OTHER PUBLICATIONS

Nakagawa et al., "Antiparallel-Coupled Oscillation in a Spin-Torque Oscillator for MAMR Using Negative-Spin-Polarization Materials," IEEE Transactions on Magnetics (vol. PP, Issue: 99, p. 1) (Year: 2026).*

Office Action in U.S. Appl. No. 17/872,831, dated Jul. 14, 2023.

Office Action in U.S. Appl. No. 17/872,831, dated Nov. 13, 2023.

Office Action in U.S. Appl. No. 17/872,831, dated Mar. 21, 2024.

Office Action in U.S. Appl. No. 17/872,831, dated Jun. 25, 2024.

Office Action in U.S. Appl. No. 17/872,831, dated Nov. 22, 2024.

Office Action in U.S. Appl. No. 17/872,831, dated Mar. 28, 2025.

Notice of Allowance in U.S. Appl. No. 17/872,831, dated Jun. 12, 2025.

Olson, T. et al., "Detrimental Effects of the STO Vertical Field Component in MAMR," IEEE Transactions on Magnetics, vol. 51, No. 11, pp. 1-4, Nov. 2015.

Zhu, J.G. et al., "Microwave Assisted Magnetic Recording," IEEE Transactions on Magnetics, vol. 44, No. 1, pp. 125-131, Jan. 2008.

* cited by examiner

DUAL-SPIN TORQUE OSCILLATOR DESIGNS IN MICROWAVE ASSISTED MAGNETIC RECORDING

CROSS REFERENCE TO RELATED APPLICATIONS

This application is a continuation of U.S. application Ser. No. 17/872,831, filed Jul. 25, 2022, the entire disclosure of which is hereby incorporated by reference.

TECHNICAL FIELD

Embodiments of the invention relate to the field of electro-mechanical data storage devices. More particularly, embodiments of the invention relate to the field of a spin transfer torque device in hard disk drives for assisting writing a state of magnetic bits on a magnetic recording medium.

BACKGROUND

A magnetic recording medium (e.g., a magnetic disk) can store magnetic bits representing digital data. A write head that incorporates a spin transfer torque device in the gap between the main writer pole and its write shield can be part of a hard disk drive (HDD) to assist writing a state of the magnetic bits data stored on the disk.

As an overall amount of digital data being stored on HDD devices increases, there is an increasing demand for increased data capacity of HDD devices. One technique to increase data capacity for a HDD can include microwave-assisted magnetic recording (MAMR). MAMR techniques increase the density of HDDs by using a write head with a spin torque oscillator (STO) to generate a microwave field, which can enhance write performance of the write head to the magnetic recording medium.

SUMMARY

The present embodiments relate to perpendicular magnetic recording writer implementing microwave-assisted magnetic recording utilizing multiple spin torque oscillators (STOs). Each STO can include a field-generation layer (FGL) that can oscillate in a same frequency and out of phase with one another. The layers in each STO can enable mutual spin transfer torques between adjacent layers, which can drive the FGLs into a large angle oscillation. The oscillation between the FGLs can cause a magnetic field to be generated that can assist in writing to a magnetic recording medium.

In a first example embodiment, a spin transfer torque assisted write head is provided. The spin transfer torque assisted write head can include a main pole configured to obtain a current flow and generate a first magnetic field to interact with a magnetic recording medium.

The spin transfer torque assisted write head can also include a trailing shield and a spin torque device disposed in a write gap portion between the main pole and the trailing shield. The spin torque device can include at least two spin torque oscillators (STOs).

Each STO can include a magnetic field generation layer (FGL) layer and one or more magnetic spin injection layer (SIL) layers. Mutual spin transfer torques can be configured to be enabled between adjacent layers in the spin torque device. The FGL layers for each of the at least two STOs can be configured to be driven into an angle oscillation as a result of the mutual spin transfer torques, with the angle oscillation forming a second magnetic field to assist in writing at the main pole.

In some instances, each FGL includes a magnetic moment of between 8-20 nanometer times tesla (nmT), and each SIL includes a magnetic moment of between 1-4 nmT.

In some instances, a direct current bias current is configured to flow from the trailing shield to the main pole via the spin torque device.

In some instances, each STO further comprises a non-magnetic spacer disposed between the FGL and the SIL. The non-magnetic spacer can include a spin diffusion length greater than a thickness of the non-magnetic spacer.

In some instances, a stack of layers for the spin torque device between the main pole and trailing shield includes: the main pole/a first spin sink/a first SIL/a first spacer/a first FGL/a second spin sink/a second SIL/a second spacer/a second FGL/a third spin sink/the trailing shield.

In some instances, a stack of layers for the spin torque device between the main pole and trailing shield includes: the main pole/a first heat sink/a first SIL/a first spacer/a first FGL/a second spin sink/a second SIL/a second spacer/a second FGL/a third spacer/a third SIL layer/the trailing shield.

In some instances, a stack of layers for the spin torque device between the main pole and trailing shield includes: the main pole/a first spin sink/a first SIL/a first spacer/a first FGL/a second spin sink/a second FGL/a second spacer/a second SIL/a third spin sink/the trailing shield.

In some instances, a stack of layers for the spin torque device between the main pole and trailing shield includes: the main pole/a first spin sink/a first FGL/a first spacer/a first SIL/a second spin sink/a second FGL/a second spacer/a second SIL/a third spin sink/the trailing shield.

In some instances, a stack of layers for the spin torque device between the main pole and trailing shield includes: the main pole/a first SIL/a first spacer/a first FGL/a second spacer/a second SIL/a first spin sink/a second FGL/a third spacer/a third SIL/a second spin sink/the trailing shield.

In some instances, a stack of layers for the spin torque device between the main pole and trailing shield includes: the main pole/a first spin sink/a first SIL/a first spacer/a first FGL/a second spacer/a second SIL/a second spin sink/a third SIL/a second FGL/a third spacer/a fourth SIL/a third spin sink/the trailing shield.

In another example embodiment, a device is provided. The device can include a main pole, a trailing shield, and a spin torque device disposed in a write gap portion between the main pole and the trailing shield.

The spin torque device can comprise at least two spin torque oscillators (STOs). Each STO can include a magnetic field generation layer (FGL) layer and one or more magnetic spin injection layer (SIL) layers. Mutual spin transfer torques can be enabled between adjacent layers in the spin torque device, and the FGL layers for each of the at least two STOs can be driven into an angle oscillation as a result of the mutual spin transfer torques.

In some instances, a direct current (DC) current source is configured to generate a DC bias current configured to flow from the trailing shield to the main pole via the spin torque device.

In some instances, each STO further comprises a non-magnetic spacer disposed between the FGL and the SIL. The non-magnetic spacer can include a spin diffusion length greater than a thickness of the non-magnetic spacer.

In some instances, any of the STOs comprises the SIL layer coupled to any of the MP or the TS.

In some instances, any of the STOs include FGL and SIL layers configured to output a negative spin polarization.

In some instances, a stack of layers for the spin torque device between the main pole and trailing shield includes: the main pole/a first spin sink/a first SIL/a first spacer/a first FGL/a second spin sink/a second SIL/a second spacer/a second FGL/a third spin sink/the trailing shield.

In another example embodiment, a method is provided. The method can include providing a device. The device can include a main pole (MP), a trailing shield (TS), and a spin torque device disposed between the MP and the TS. The spin torque device can include at least two spin torque oscillators (STOs). Each of the STOs can include a magnetic field generation layer (FGL) layer and a magnetic spin injection layer (SIL) layer.

The method can also include generating, by a direct current (DC) source, a DC current flow along an electrical path between the MP and TS via the spin torque device. The MP can generate a first magnetic field for interacting with a magnetic recording medium. Further, mutual spin transfer torques are enabled between adjacent layers in the spin torque device, the FGL layers for each of the at least two STOs are driven into an angle oscillation forming a second magnetic field to assist in writing at the main pole.

In some instances, each STO further comprises a non-magnetic spacer disposed between the FGL and the SIL, wherein the non-magnetic spacer includes a spin diffusion length greater than a thickness of the non-magnetic spacer.

In some instances, any of the STOs comprises the SIL layer coupled to any of the MP or the TS.

In some instances, a stack of layers for the spin torque device between the main pole and trailing shield includes: the main pole/a first spin sink/a first SIL/a first spacer/a first FGL/a second spin sink/a second SIL/a second spacer/a second FGL/a third spin sink/the trailing shield.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

A disk drive can include a write head to interact with a magnetic recording medium to read and write digital data to the magnetic recording medium. As the amount of digital data is required to be stored increases and with an increase in data aerial density of HDD writing, both write head and digital data written to the magnetic recording medium can be made smaller.

However, as the size of writers decreases, a writability of the writer can degrade. Various techniques can be used to assist in writing, such as thermally-assisted magnetic recording (TAMR) and spin torque assisted magnetic recording. Spin torque assisted magnetic recording can use spin torque devices to generate a high frequency field to assist with writing to the magnetic recording medium (e.g., microwave assisted magnetic recording (MAMR)) and using spin torque to reverse a layer in the device in order to guide the magnetic flux more concentrated from the main pole (e.g., spin torque reversal assisted magnetic recording (STRAMR)).

Figure 1A:
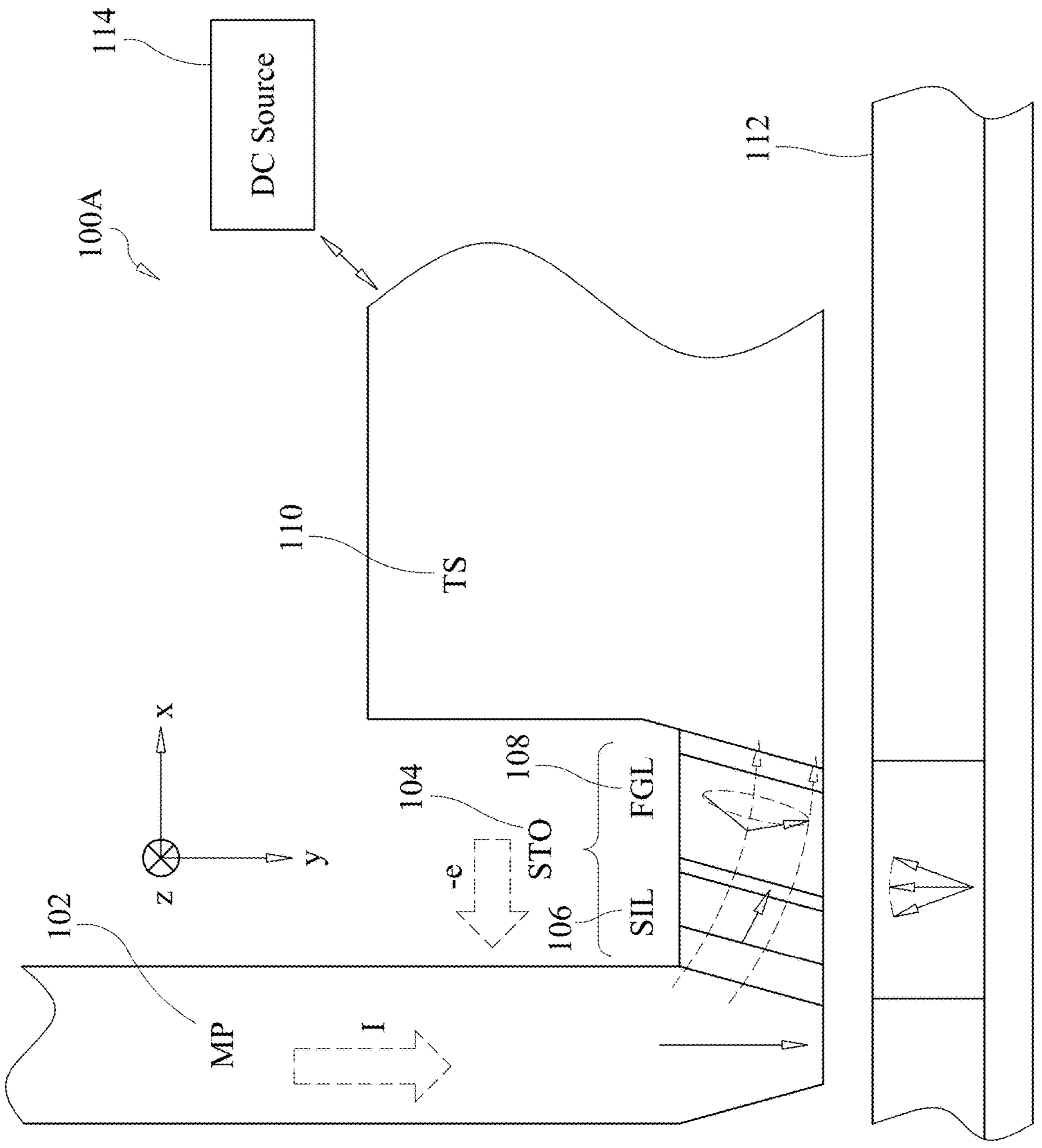
FIG. 1A is a block diagram of a write head implementing a MAMR technique according to an embodiment.

FIG. 1A is a block diagram of a write head 100A implementing a MAMR technique. As shown in FIG. 1A, a spin torque oscillator (STO) 104 can be placed in the write gap between the main writer pole (MP) 102 and the write shield that is located on the trailing side of the MP, which can be called the trailing shield (TS) 110. The magnetic flux from the MP 102 can go through a media bit layer and can be collected by the TS 110. The STO 104, located in the write gap (WG) between the MP and the TS, can be composed of a high moment magnetic layer (e.g., more than 8 nanometers times tesla (nmT)), which can include a field generation layer (FGL) 108 and another magnetic spin injection layer (SIL) 106. When a current is applied between the MP and the TS via the STO, the current can be spin-polarized by the SIL and can interact with the FGL by the spin transfer torque such that the magnetic moment of the FGL is driven into large angle oscillations, typically at the frequency 5-50 GHz. The dipolar field generated by the FGL oscillation can be received by the magnetic bit in the medium to reduce its switching coercivity so that it makes the MP easier to write the bit.

The MP 102 can be disposed adjacent to an air bearing surface (ABS) comprising a surface adjacent to the magnetic recording medium 112. Further, a direct current (DC) source 114 can provide a current flow to the write head 100A. For instance, the current flow can flow between the MP 102 and TS 110 via the STO 104. The MP 102 can generate a magnetic field to interact with the magnetic recording medium 112, and the STO 104 can generate a microwave field to assist in writing to the disk 112.

Figure 1B:
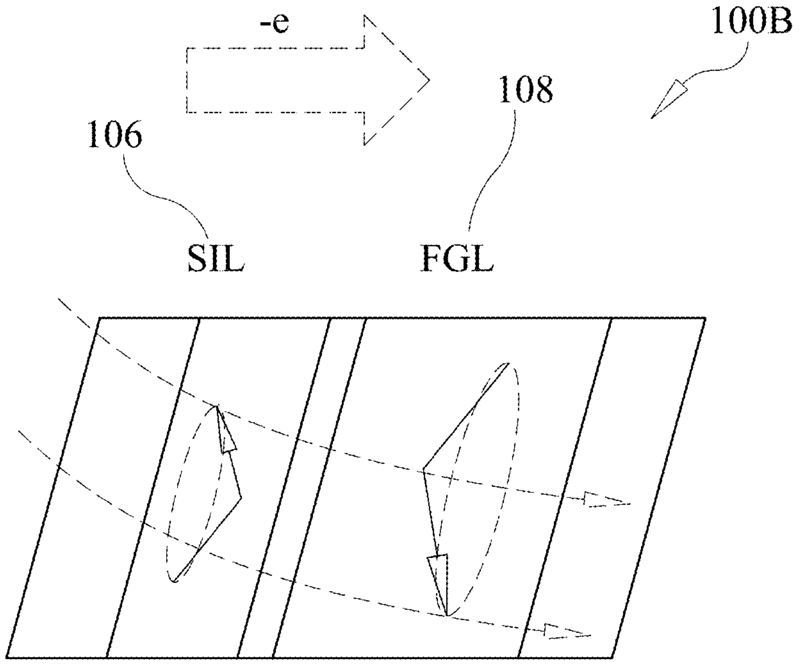
FIG. 1B is a block diagram of a first example STO design for a write head implementing a MAMR technique according to an embodiment.
Figure 1C:
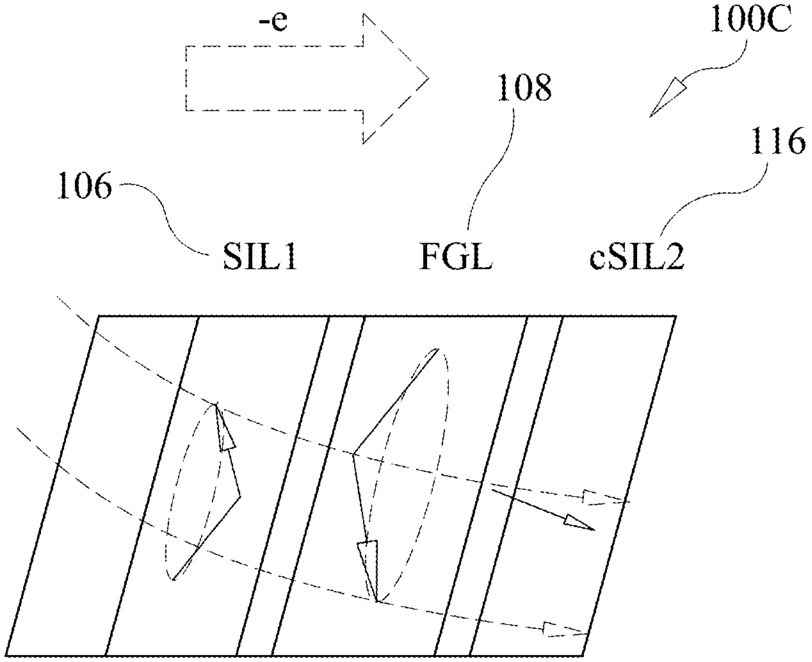
FIG. 1C is a block diagram of a second example STO design for a write head implementing a MAMR technique according to an embodiment.

In many cases, the MAMR with one-layer FGL can include three geometries, shown in FIGS. 1A-C, respectively. FIGS. 1B-C illustrate a first set of example MP and TS structures. In FIGS. 1B-C, the MP and TS structure can stay the same, and only the STO layer structure in the WG may be presented.

For example, FIG. 1B illustrates a STO stack 100B that includes a layer stack between the MP and TS including: a spin sink, a first SIL 106, a spacer, a first FGL 108, and a second spin sink. As another example, FIG. 1C illustrates a STO stack 100C that includes a layer stack between the MP and TS including: a spin sink, a first SIL 106, a first spacer, a first FGL 108, a second spacer, a second SIL, and a second spin sink.

In many instances, a MAMR device can include a one-layer FGL, with a resulted rf field in the cross-track direction (z direction), and in the down-track direction (x direction) if any, can assist, whereas the component perpendicular to the medium surface (y direction) may be detrimental. In other cases, a dual FGL structure can be implemented, where the magnetization of FGL1 and FGL2 can oscillate out of phase with each other because of the dipolar coupling (and possibly exchange coupling and spin torque interactions) between the FGL1 and FGL2, as is shown in FIG. 2A.

Figure 2A:
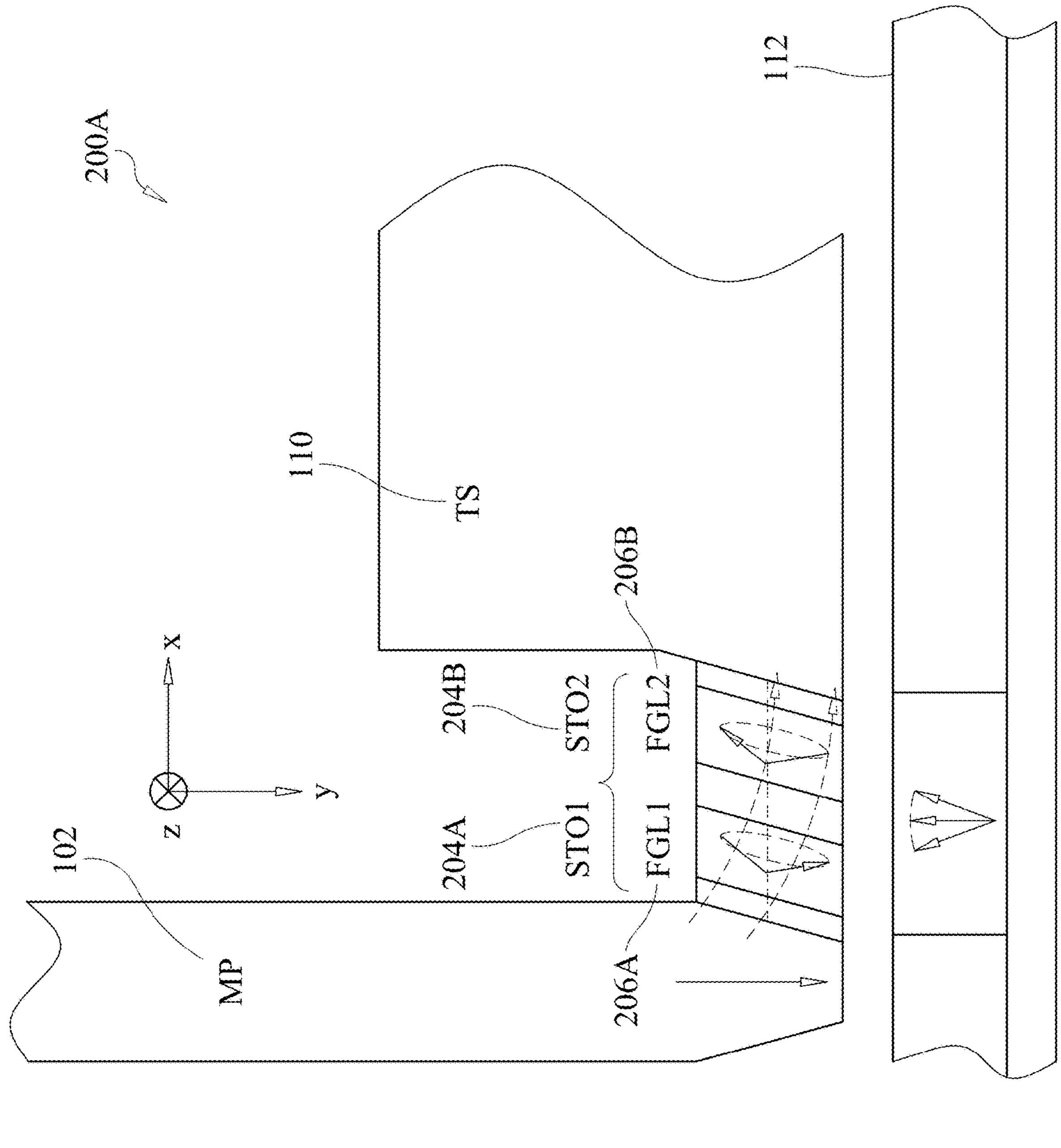
FIG. 2A is a block diagram of a write head implementing a MAMR technique with dual STOs (or dual FGLs) according to an embodiment.
Figure 2B:
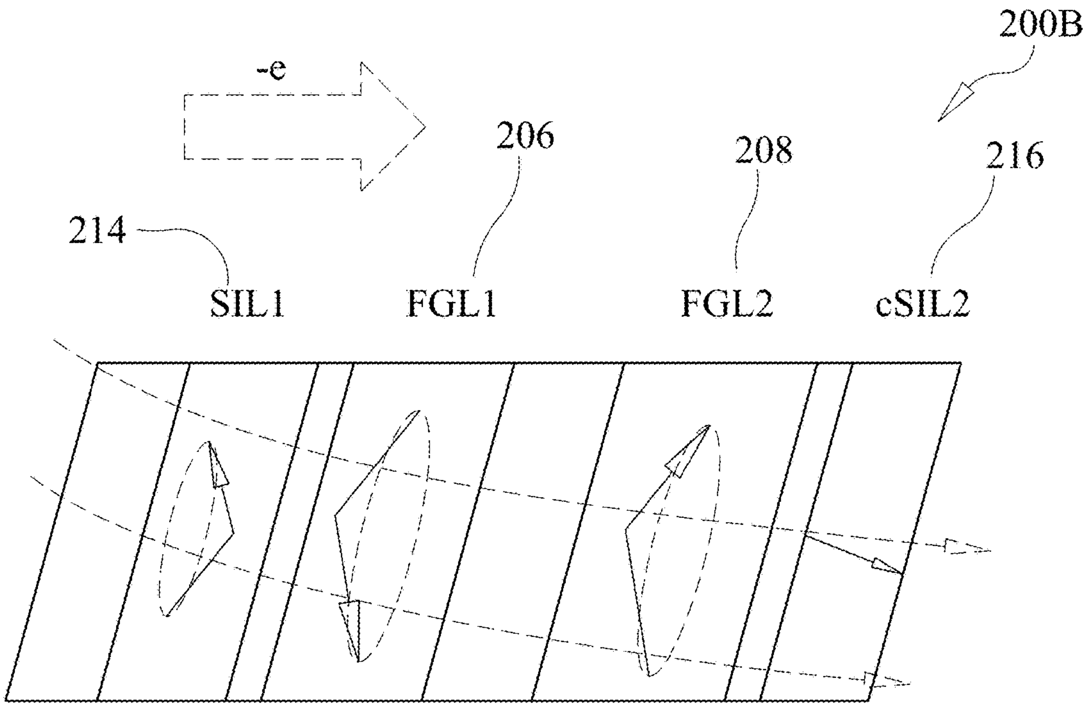
FIG. 2B is a first example STO stack with a dual STO or dual FGL design according to an embodiment.
Figure 2C:
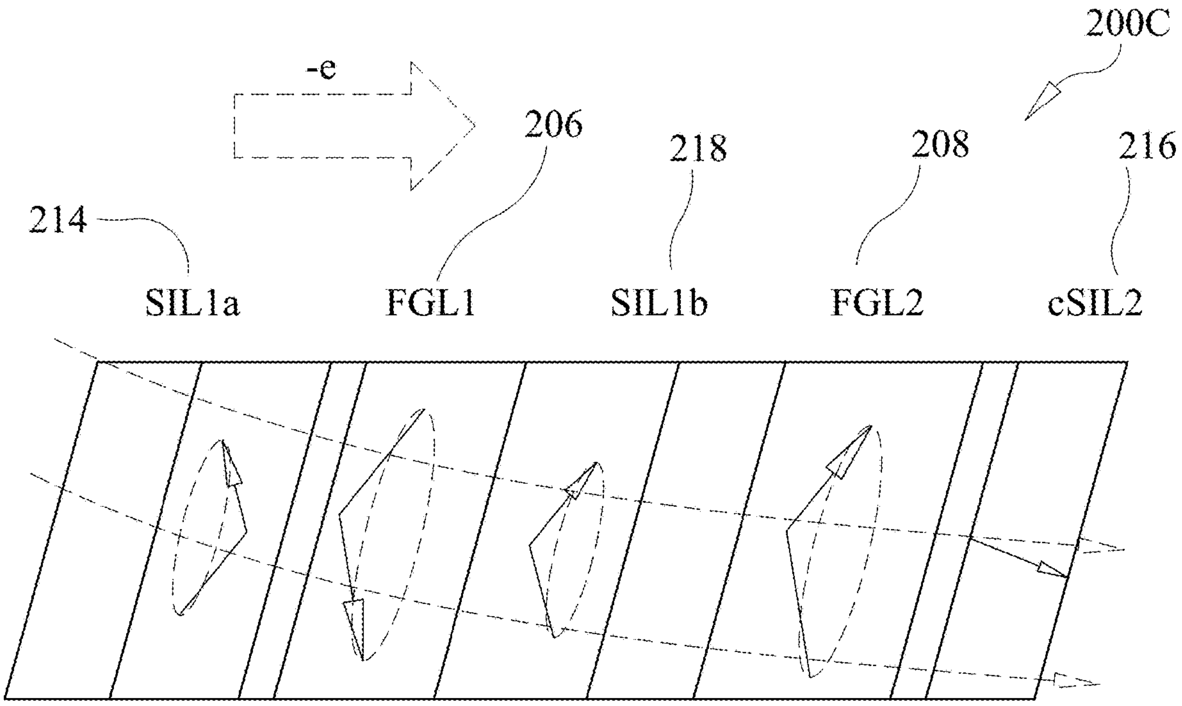
FIG. 2C is a second example STO stack with a dual STO or dual FGL design according to an embodiment.

FIGS. 2A-C illustrate a second set of example MP and TS structures 200A-C. As shown in FIG. 2A, the write head 200A can include a STO 204 disposed between MP 102 and TS 110 that includes multiple FGL layers 206, 208.

Further, FIGS. 2B-2C illustrate STO stack. For example, FIG. 2B illustrates a STO stack 200B that includes a layer stack between the MP and TS including: a spin sink, a first SIL 214, a spacer, a first FGL 206, a second spin sink, a second FGL 208, a second spacer, and a second SIL 216. As another example, FIG. 2C illustrates a STO stack 200C that includes a layer stack between the MP and TS including: a spin sink, a first SIL 214, a first spacer, a first FGL 206, a second spacer, a second SIL 218, a second spin sink, a second FGL 208, a third spacer, and a third SIL 216.

The y- and z-components of the rf field can be mostly canceled, whereas its x-component can be maximized. FIGS. 2B-C provide two example geometries from the structure in FIG. 2A. FIG. 2A can have a FGL1 driven by a free SIL1 located between the FGL1 and the MP, and FGL2 driven by a SIL2 coupled to the TS (cSIL2). A non-magnetic spacer with a long spin diffusion length (typically far greater than its layer thickness, at the order of tens to hundreds of nm such as Cu, Ag, Au, etc.) can be inserted between each FGL and SIL pair. Further, a non-magnetic spin sink (short spin diffusion length <20 nm materials, such as Ta, Pt, Ir, etc.), can be inserted between the MP and SIL1, and between FGL1 and FGL2, in order to avoid the spin transfer between them. FIG. 2C can include a design with FGL1 sandwiched between two free SILs: SIL1*a* and SIL1*b*, with FGL2 and cSIL2 staying the same. In this design, spacer can also be applied between FGL1 and SIL1*b*, and the sink can be applied between SIL1*b* and FGL2.

The above-mentioned geometries can have the top and bottom STO properties different from each other such that it is not easy for FGL1 and FGL2 to oscillate under the same frequency. If FGL1 and FGL2 oscillate individually at different frequencies, the cancellation of the detrimental rf field in the y direction may not be able to be achieved, and the assist can be decreased. The present embodiments relate to write head designs that can effectively synchronize the FGL oscillations to make a more robust dual FGL STO stack to realize a best MAMR assist.

Further, the present embodiments can provide a dual FGL STO stack with FGL1 and FGL2 oscillations in the same rf frequency and out of phase with each other. At the same time, the oscillation amplitude of each FGL and the resulted down-track rf field can be maximized, where the component perpendicular to the medium can be minimized. Additionally, the present embodiments can provide a robust dual FGL design to efficiently optimize the spin torque induced MAMR assist in the write gap. The desired rf field amplitude can be at a low enough biasing current density so that the device has enough margin for its reliability. If the above are implemented, the time average of the total magnetic moment in the WG can be projected to the direction perpendicular to the film surface with the biasing current turned on, can be as small as possible. This can be noted as the total magnetic shunt in the WG, and writer performance can increase as the total magnetic shunt is smaller.

Further, the spin torque assisted recording head design can include at least three techniques that can effectively cancel the detrimental component of the rf field perpendicular to the media, whereas a component along the written track direction can be maximized. The rf field amplitude can be expected higher than that in other write heads. These designs can achieve better frequency synchronization of the oscillations between FGL1 and FGL2. The oscillation frequencies can be the same under a much wider range of current densities, whereas the frequency locking may only occur at a very small current density regime in prior arts. Frequency locking between FGL1 and FGL2 can enable effective cancellation of the detrimental rf field in the direction perpendicular to the medium.

In some of the embodiments, the total magnetic moment projected in the direction perpendicular to the film can be lower compared to that in other write heads, so that the initial writer performance is also better. At a desired resulted rf field amplitude along the down track direction, the current density can be reduced to improve spin torque device reliability.

The present embodiments can provide a spin transfer torque assisted magnetic recording device. The device can include a magnetic main pole (MP) that can provide a strong and concentrated field to write to a magnetic recording medium. The device can further include a trailing write shield (TS) that can be used to collect magnetic flux back to the writer.

The device can include a spin torque device located in the write gap between the MP and the TS, which can include at least two spin torque oscillators (STOs) to assist in writing. Each STO can include multiple magnetic layers to enable mutual spin transfer torques between adjacent magnetic layers. Each spin torque oscillator can include one field-generation layer (FGL), that can include a heavy magnetic moment 8-20 nmT, and at least one magnetic layer that can have a low magnetic moment 1-4 nmT, called a spin-injection layer (SIL). The device can further include a direct current (DC) source to provide a DC bias current from the TS to the MP through the said spin torque device. The multiple magnetic layers in each STO can be separated by non-magnetic spacers that can include spin diffusion length longer than their individual thicknesses (e.g., more than 5 times), which can be comprised of Cu, Ag, Au, or Cr, or their alloys. A short spin diffusion length material can be disposed between STOs, between one STO and the MP, and between the TS and the other ST. The short spin diffusion length (shorter than their thickness) material can include Ta, Pt, Ir, etc., and their alloys and/or a multiplayer stack (e.g., a spin stack).

As a result of the spin transfer torque between each adjacent magnetic pair, the two FGLs can be driven into large angle oscillation, yielding an rf magnetic field from the oscillating FGLs to assist writing. The device can interact with a magnetic medium that is to be written by the device. The device (e.g., or writer) can fly above and write to the medium. The spin torque induced rf field can interact with the said medium bit to reduce the medium bit's coercive field.

In some instances, the device can include a layer stack of MP\sink\SIL1\spacer\FGL1\sink\SIL2\spacer\FGL2\sink\TS.

In some instances, one of the STOs with one of the SILs can be coupled to the MP or to the TS. In some instances, one of the STOs has both SIL and FGL composed of a special material that can output a current with a negative spin polarization, and the stack sequence of that SIL and FGL can be reversed. In some instances, as shown by modeling results, the device can have both FGL1 and FGL2 oscillating with a larger amplitude projected into the film plane.

In some instances, as shown by modeling results, the FGL1 and FGL2's oscillations can be projected to the film plane under the same frequency and the same chirality, but out-of-phase with each other, so that the detrimental component of the resulted rf field can be minimized whereas the component of the rf field in the direction along the written track is maximized. In some instances, as shown by modeling results, the device can have oscillation frequency locking of FGL1 and FGL2 in a much wider range of current density to increase writer robustness. In some instances, as shown by modeling results, the present embodiments can provide a larger rf field amplitude in the direction along the track under the same current density.

In some instances, as shown by modeling results, the present embodiments can provide a lower current density that is needed to achieve a desired rf field amplitude. In some instances, as shown by modeling results, the present embodiments can provide a lower total magnetic moment perpendicular to the film surface, and therefore the writer performance can be improved. In some instances, the device can have a reversed stack and a reversed current direction. In some instances, the device can have SIL on a different side or both sides of the FGL.

Figure 3A:
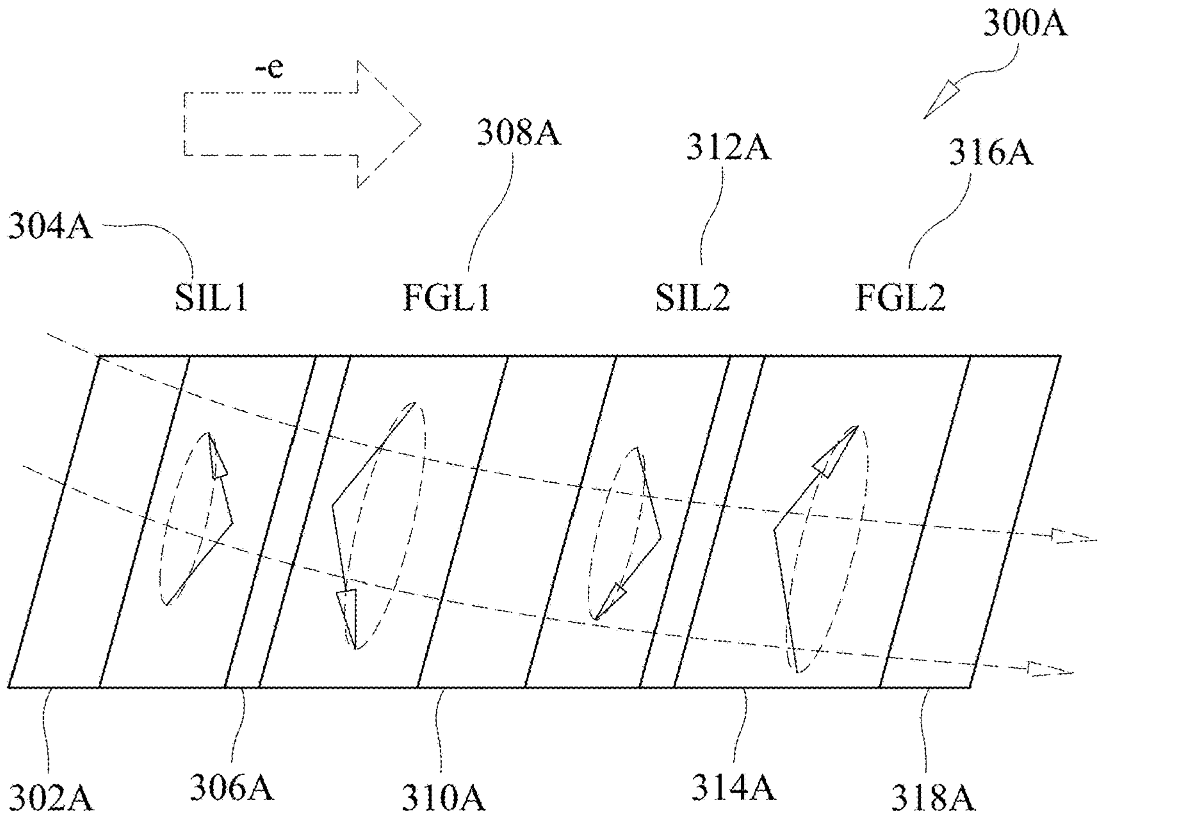
FIG. 3A is an illustration of a first example of the STO stack between MP and TS according to an embodiment.

As noted above, the present embodiments provide designs for write heads that can also realize the MAMR function under dual FGL, with oscillation frequency and phase of each FGL locked so that the MAMR assist can be optimized. FIG. 3A is an illustration of a first example MP and TS stack. The layer stack can include a series of connected layers in the write head. The layer stack can signify each layer when viewed from left-to-right. For example, in FIG. 3A, the stack can include MP\sink\SIL1\spacer\FGL1\sink\SIL2\spacer\FGL2\sink\TS. The stack can include the main pole (e.g., 202) sink (e.g., 302A), SIL1 (e.g., 304A), spacer (e.g., 306A), FGL1 (e.g., 308A), sink (e.g., 310A), SIL2 (e.g., 312A), spacer (e.g., 314A), FGL2 (e.g., 316A), sink (e.g., 318A) connected to a TS (e.g., 210).

The SILs (e.g., 304A, 312A) can have low magnetic moment 1-4 nmT, whereas FGLs (e.g., 308A, 316A) can have high magnetic moments 8-20 nmT. The stack can include two sets of STOs with similar or identical layer stack. Under zero biasing current, all magnetic layers can have magnetic moments tilted towards the total fields acting on them (e.g., a sum of the write gap field (gray dot arrows), demagnetization field and mutual dipolar field). With an applied current that has negative electrons flowing from the MP (e.g., 202) to the TS (e.g., 210), both SILs (e.g., 304A, 312A) can be flipped towards the direction against the WG field due to the spin transfer torque (STT) between each SIL-FGL pair. With an increasing biasing current, the FGLs (e.g., 308A, 316A) can be driven into larger angle oscillations with the oscillation cone angle along the WG field, whereas SILs may also be driven into oscillations with the cone angle against the WG field. The oscillating high moment FGLs can determine most of the rf field, and the mutual dipolar interactions between FGL1 and FGL2 can make them oscillate out of phase. The rf field detected on the medium below may have y and z components mostly cancelled, whereas the one in the x (along the written track, or down track) direction may be maximized to realize the assist in the medium.

Figure 3B:
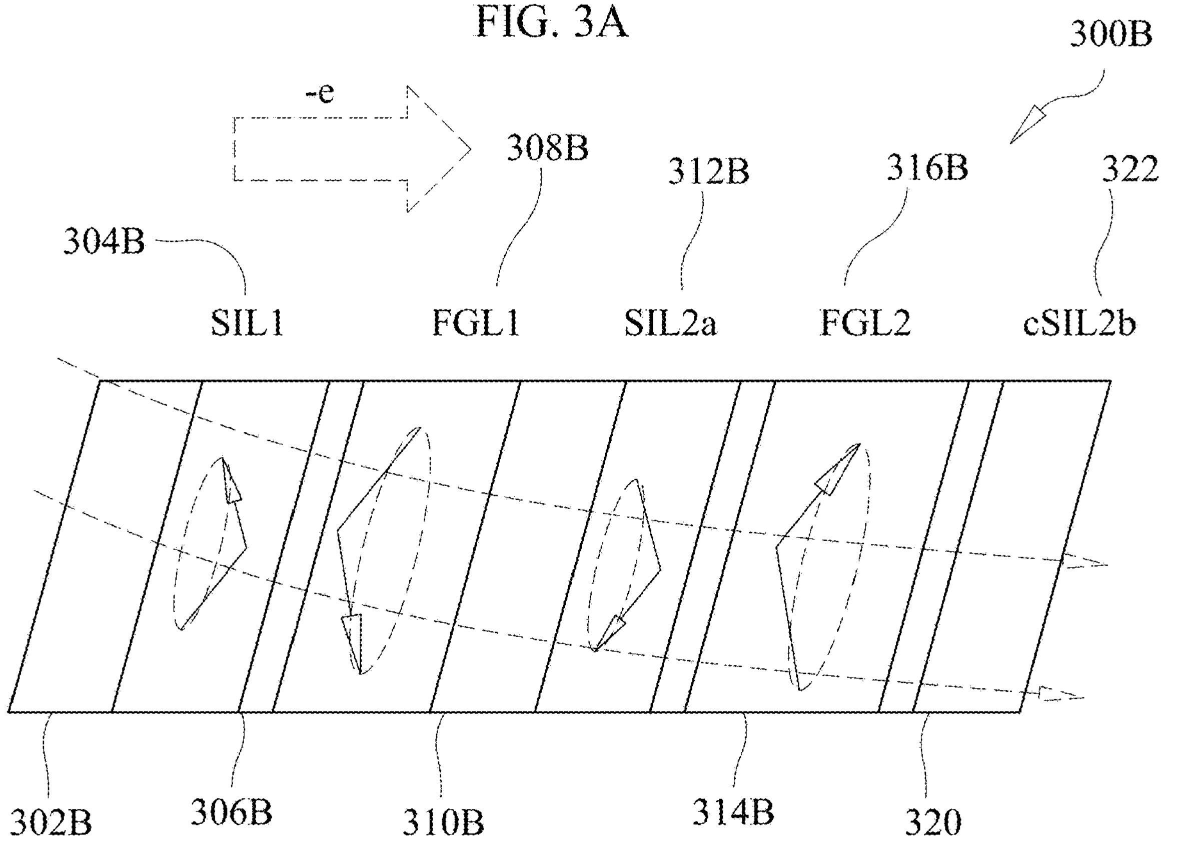
FIG. 3B is an illustration of a second example of the STO stack between MP and TS according to an embodiment.

FIG. 3B is an illustration of a second example MP and TS stack. A second design can have a lower SIL1-FGL1 pair with the top STO has the FGL1 between a free lower SIL2*a* and an upper cSIL2*b* that is magnetically coupled to the TS. As shown in FIG. 3B, the stack can include a FGL2 (e.g., 316B) connected to a spacer (e.g., 320) and a cSIL2B (e.g., 322).

In this case, FGL2 can receive STT from both SIL2*a* and cSIL2*b*. The cone angle of the FGL can be around 90 deg. The volume of the FGL2 can be smaller than that of the FGL1 due to the nature of the device etching, and this can increase the oscillation cone angle to compensate the rf field amplitude loss from the reduced volume.

Figure 3C:
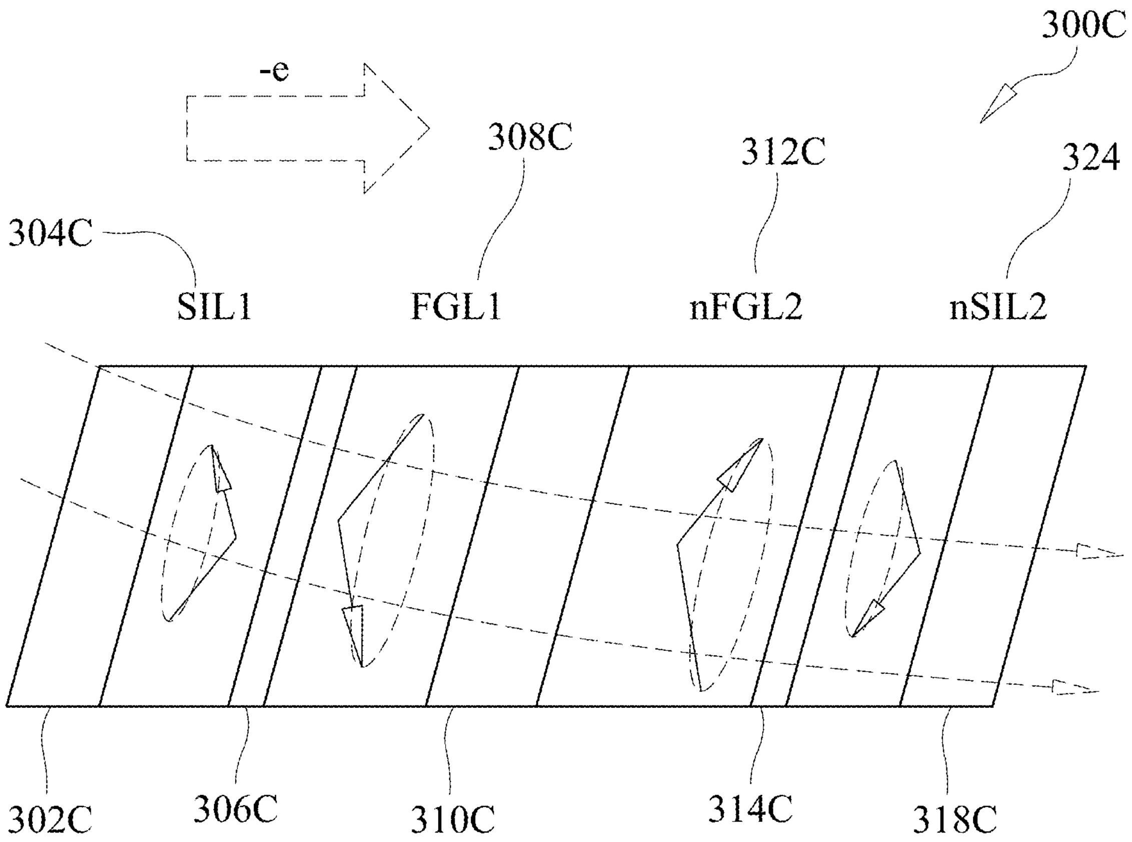
FIG. 3C is an illustration of a third example STO stack according to an embodiment.

FIG. 3C is an illustration of a third example MP and TS stack. A third design can have the lower SIL1-FGL1 pair and spin polarization (P0) between SIL1 and FGL1 being positive. For example, the stack can include nFGL2 (e.g., 312C), a spacer (e.g., 314C), nSIL2 (e.g., 324), and sink (e.g., 318C).

The top STO has FGL2 and SIL2 can include a negative spin polarization (P0) material, which can include a magnetic material that has a negative bulk spin current asymmetry factor β, such as FeCr, FeCoCr, FeV etc, and/or faces another layer to create a negative interfacial spin current asymmetry factor γ, such as FeCo facing Cr, Iron (Fe) facing chromium (Cr), FeCr facing Cr etc, so that the P0 of the outgoing current from that layer is typically a negative value. With the current applied in the same direction, the location of the nFGL2 and nSIL2 can be reversed. Compared to the first design in FIG. 3A where SIL2 is adjacent to both FGL1 and FGL2 and its dynamics is impacted by dipolar fields from both FGLs, the design in FIG. 3C can have nSIL2 dynamics mainly impacted by dipolar interaction of nFGL2 only. The dynamics of the FGLs can become even more stable compared to those of other designs.

Figure 4:
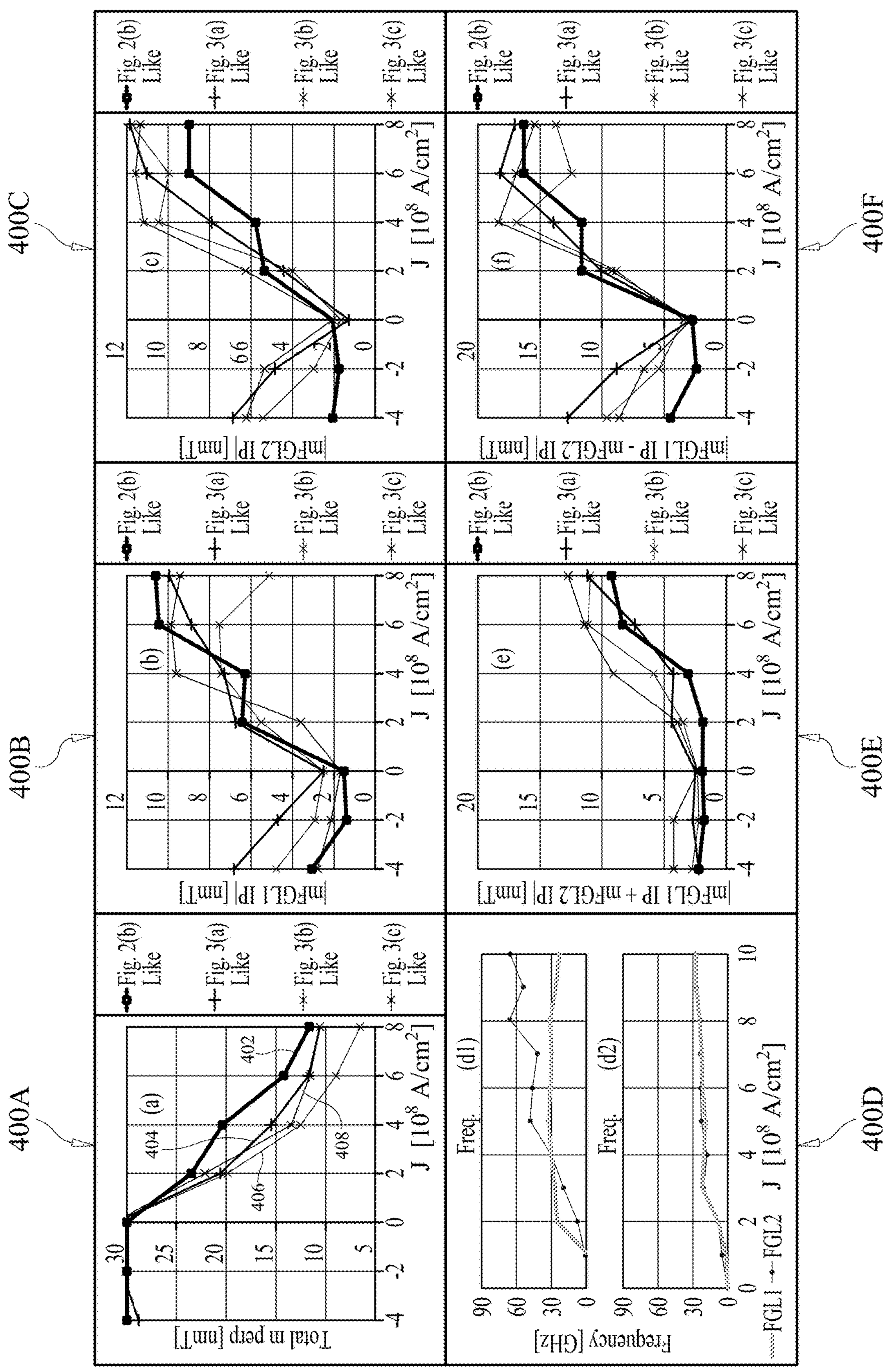
FIG. 4 provides a set of graphical illustrations depicting modeling results of the writer as described herein.

FIG. 4 provides a set of graphical illustrations 400A-F depicting modeling results of the writer as described herein. The first line 402 can include results of a design depicted in FIG. 2B for example, while the second line 404 can represent results from the design in FIG. 3A, the third line 406 can represent the results from the design in FIG. 3B, and the fourth line 408 can represent the results from the design in FIG. 3C.

The horizontal axis can include the applied current density J and positive J is defined so that the electrons flow from the MP to the TS. $J \sim 4\times10^{8}$ $A/cm_{2}$, can be allowable for metallic device reliability, and $J \sim 6\times10^{8}$ $A/cm^{2}$, can be a limit of the current density for reliability tolerance. A first graph 400A can include the total magnetic moment in the WG perpendicular to the device film surface, which can likely degrade the initial writer performance. Results can show lower perpendicular moment at the operating current density $J=4\times10^8$ A/$cm^2$, which can yield a lower magnetic shunt and thus a better writer performance compared to prior arts. The second 400B and third 400C illustrations can represent the magnitude of the oscillating magnetic moment of FGL1 and FGL2 projected in the film plane. The larger the in-plane oscillating moment, the larger the assisting rf field. Results of the designs can show larger in-plane magnetic moment at the operating current density $J=4\times10^8$ A/$cm^2$, yielding a better assist potential compared to prior arts. The fourth representation 400D can represent the oscillation frequency of the FGL1 and FGL2 of the prior art presented in FIG. 2C, and FGL1 and FGL2's oscillation frequencies can be the same only for a very small range of J, so that the oscillation of the FGL1 and FGL2 moments are not easy to be locked into my single frequency to perform the dual FGL out-of-phase oscillation.

Further, in the fourth representation 400D, the oscillation frequency of the FGL1 and FGL2 can be synchronized in the design shown in FIG. 3A, and therefore the detrimental component of the rf field perpendicular to the medium can be easily cancelled, whereas the assisting component of the rf field in the down track direction can be well maximized. Representations 400E, 400F can include the vector sum and vector difference of FGL1 and FGL2's magnetic moments projected in the film plane respectively. The vector difference can be higher compared to vector sum, indicating that the oscillations of the FGL1 and FGL2 are more dominated by the out-of-phase oscillations. Such vector difference can be proportional to the assisting rf field in the down track direction.

The present embodiments can provide a robust design to utilize spin transfer torque to drive the dual FGL design of the STO located in the WG between the MP and the TS. Compared to other writer designs, the present embodiments can provide a better oscillation frequency synchronization robustness and a stronger assist. At the same time, the total magnetic moment perpendicular to the film plane can be reduced so that the initial writer performance is also improved. As a result, the designs can gain both writer performance and MAMR assist, which can improve final recording performance and areal density capability.

Figure 5A:
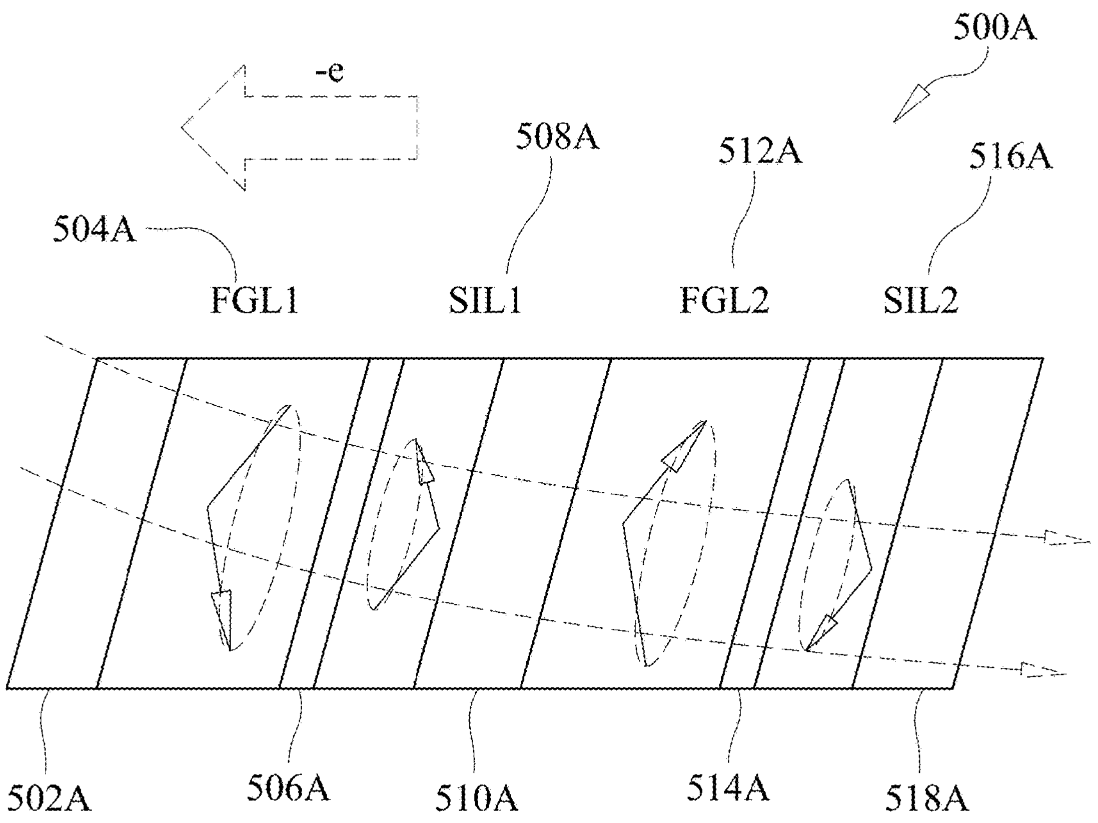
FIG. 5A illustrates a first example STO stack with a layer stack reversed and a current applied in a reversed direction according to an embodiment.
Figure 5B:
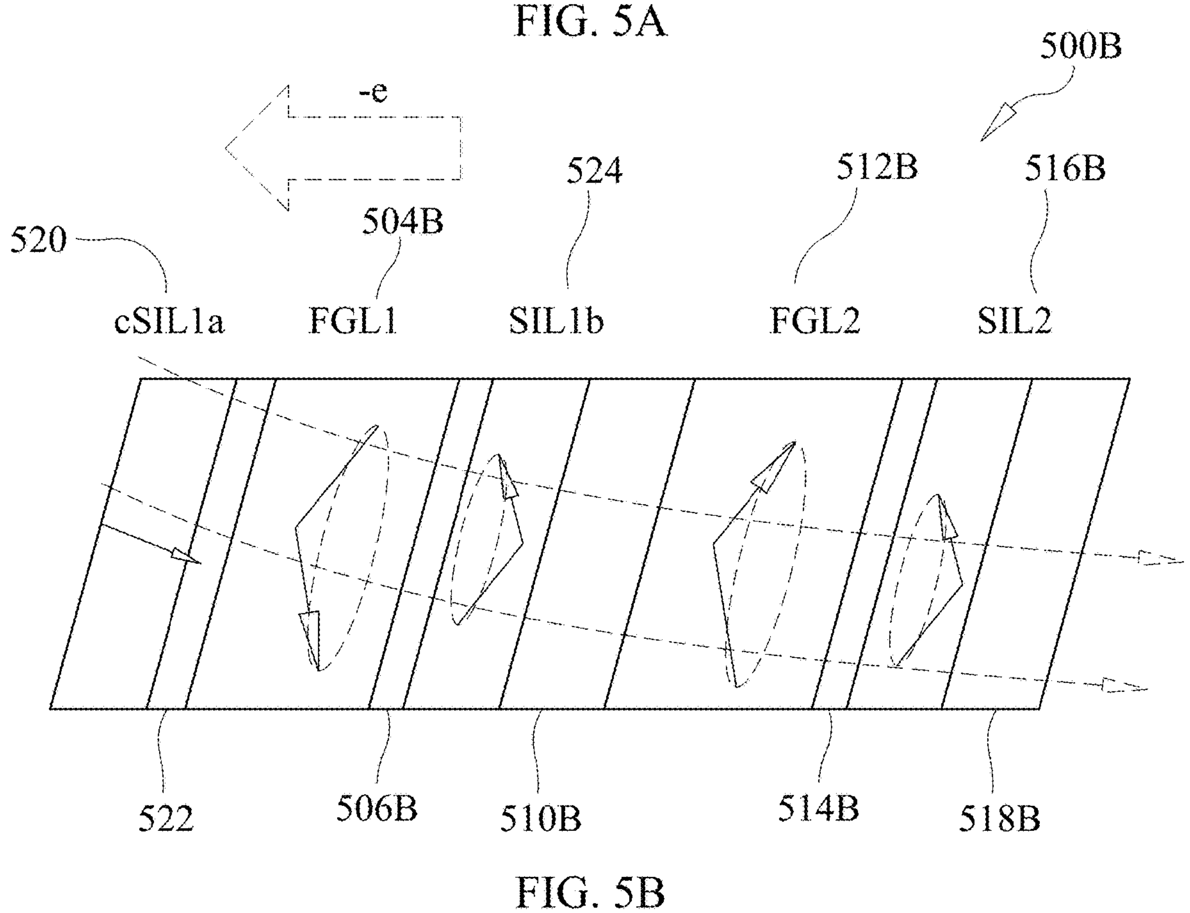
FIG. 5B illustrates a second example STO stack with a layer stack reversed and a current applied in a reversed direction according to an embodiment.
Figure 5C:
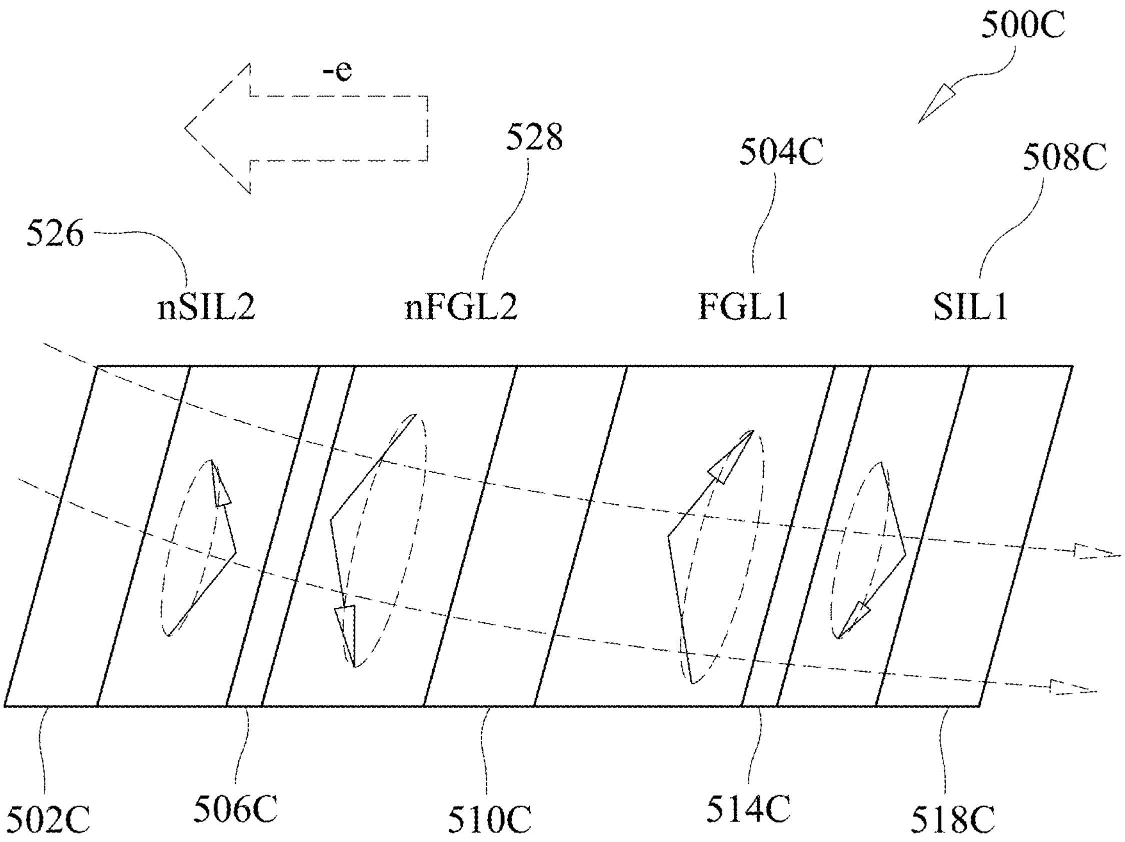
FIG. 5C illustrates a third example STO stack with a layer stack reversed and a current applied in a reversed direction according to an embodiment.

FIGS. 5A-C illustrate example MP to TS designs with a layer stack reversed and a current applied in a reversed direction. For example, in a first example design 500A in FIG. 5A, a stack can include a sink 502A, a FGL1 504A, a spacer 506A, SIL1 508A, a sink 510A, FGL2 512A, spacer 514A, SIL 516A, and a sink 518A. The layer stack can comprise: MP\sink\FGL1\spacer\SIL1\sink\FGL2\spacer\SIL2\sink\TS.

In a second example design 500B in FIG. 5B, the stack can include a cSIL1*a* 520, a spacer 522, FGL1 504B, spacer 506B, SIL1*b* 524, a sink 510B, FGL2 512B, spacer 514B, SIL2 516B, and sink 518B. The layer stack in this example can include MP\cSIL1*a*\spacer\FGL1\spacer\SIL1*b*\sink\FGL2\spacer\SIL2\sink\TS.

In a third example design 500C in FIG. 5C, the stack can include a sink 502C, nSIL2 526, a spacer 506*c*, nFGL2 528, sink 510C, FGL1 504C, spacer 514C, SIL1 508C, and sink 518C. The layer stack in this example can include MP\sink\nSIL2\spacer\nFGL2\sink\FGL1\SIL1\sink\TS.

FIGS. 6A-D illustrate example MP to TS designs 600A-D. For example, in a first example design 600A in FIG. 6A, a stack can include a sink 602A, FGL1 604A, a spacer 606A, SIL1 608A, a sink 610A, FGL2 612A, spacer 614A, SIL2 616A, and a sink 618A. The layer stack can comprise: MP\sink\FGL1\spacer\SIL1\sink\FGL2\spacer\SIL2\sink\TS.

Figure 6A:
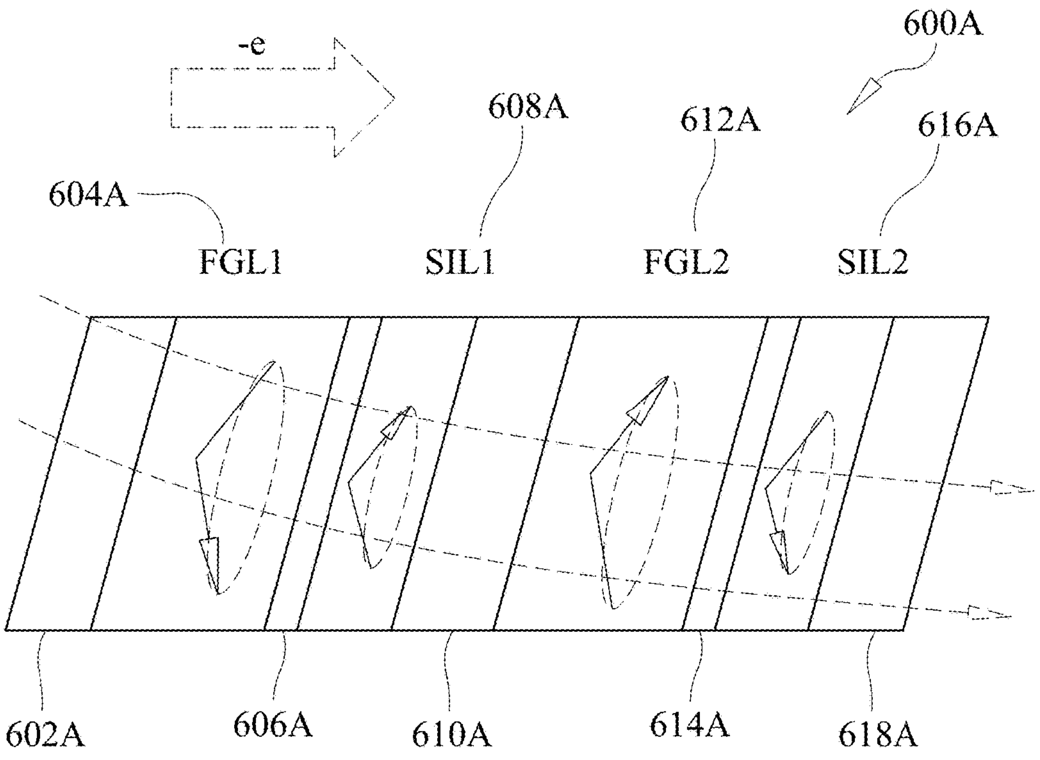
FIG. 6A illustrates a first example STO stack according to an embodiment
Figure 6B:
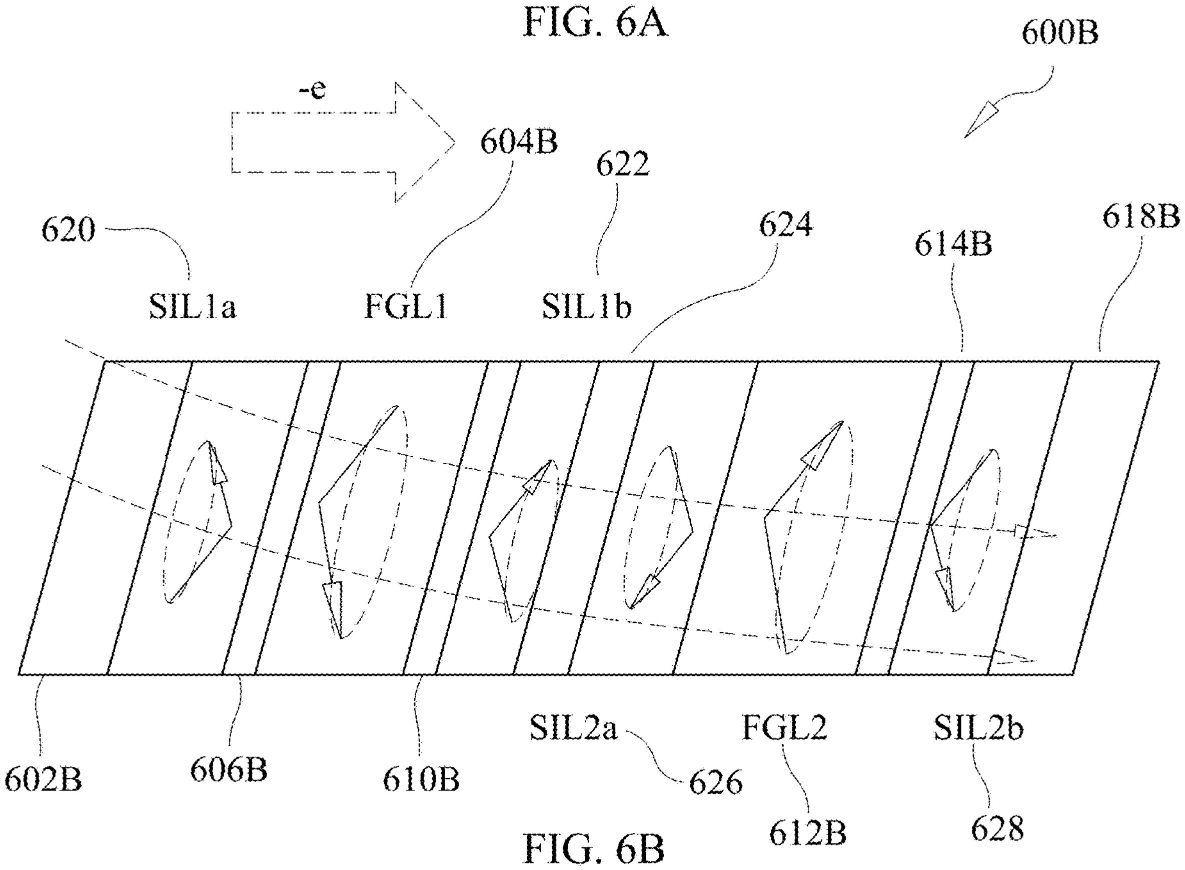
FIG. 6B illustrates a second example STO stack according to an embodiment

In a second example design 600B in FIG. 6B, the stack can include a spin sink 602B, SIL1*a* 620, spacer 506B, FGL1 604B, SIL1*b* 622, a sink 624, SIL2*a* 626, FGL2 612B, spacer 614B, SIL2*b* 628, and sink 618B. The layer stack in this example can include MP\sink\SIL1*a*\spacer\FGL1\spacer\SIL2*a*\sink\FGL2\spacer\SIL2*b*\sink\TS.

Figure 6C:
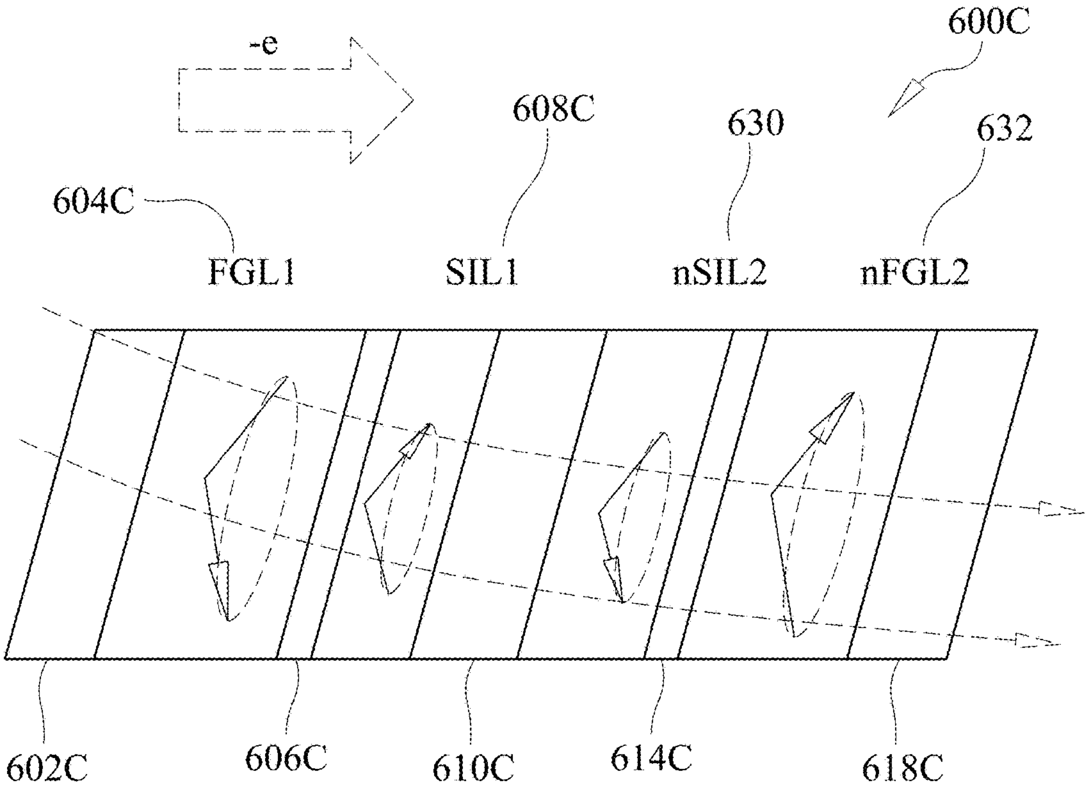
FIG. 6C illustrates a third example STO stack according to an embodiment

In a third example design 600C in FIG. 6C, the stack can include a sink 602C, FGL1 604C, spacer 606C, SIL1 608C, sink 610C, nSIL2 630, spacer 614C, nFGL2 632, and a sink 618C. The layer stack in this example can include MP\sink\FGL1\spacer\SIL1\sink\nSIL2\spacer\nFGL2\sink\TS.

Figure 6D:
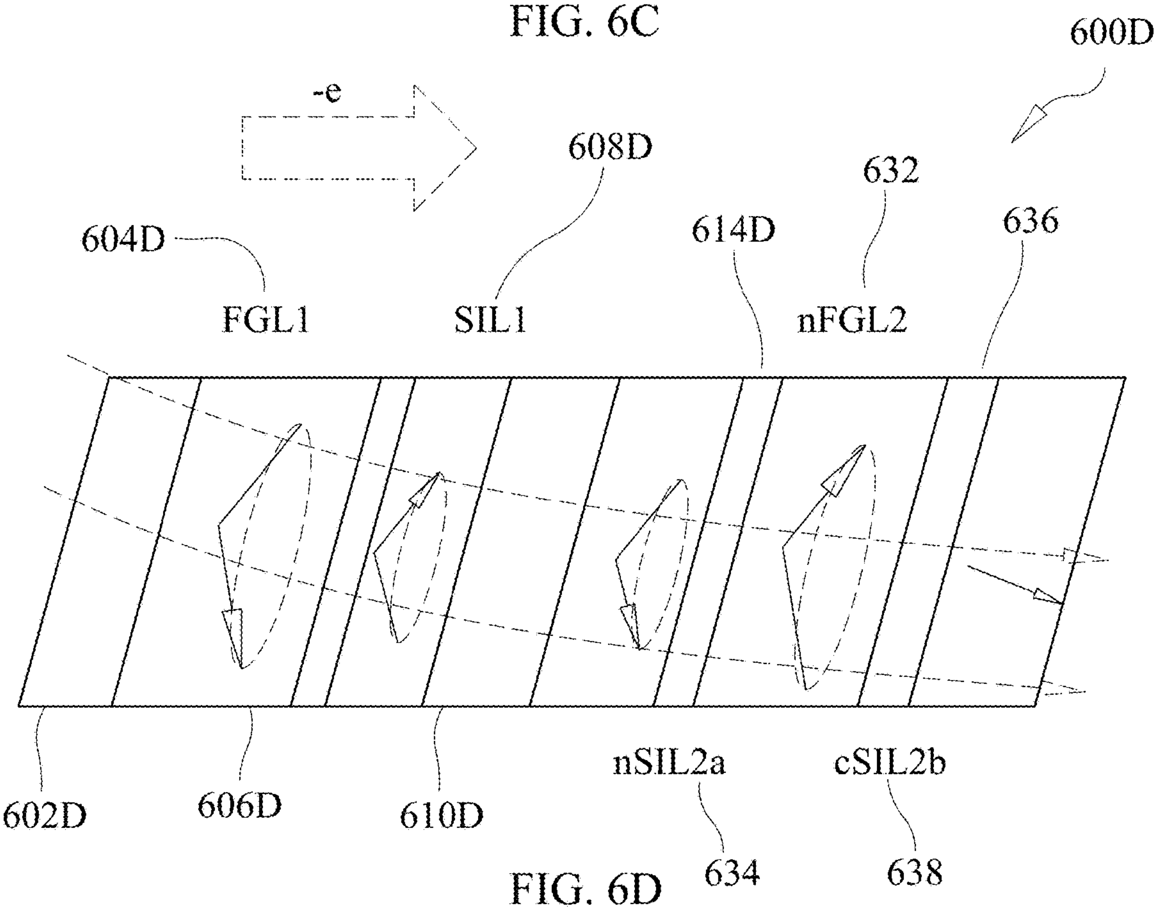
FIG. 6D illustrates a fourth example STO stack according to an embodiment

In a fourth example design 600D in FIG. 6D, the stack can include a sink 602D, FGL1 604D, spacer 606D, SIL1 608D, sink 610D, nSIL2*a* 634, spacer 614D, nFGL2 632, a sink 636, and cSIL2*b* 638. The layer stack in this example can include MP\sink\FGL1\spacer\SIL1\sink\nSIL2*a*\spacer\nFGL2\sink\cSIL2*b*\TS.

As shown in FIGS. 6A-6D, the current can still be applied in the direction where negative electrons flow from the MP to the TS, but the SIL locations can be different. FIG. 6A can include a scenario where SIL1 and SIL2 are located on the other side of the FGLs, but now the cone angle of the SIL1 and SIL2 can be along the WG field direction. The total moment perpendicular to the film surface can be larger than that in the design presented in FIG. 3A.

FIG. 6B can include a scenario where FGLs are sandwiched between two SILs. There may include cases where only one of SIL1-FGL1 SIL2-FGL2 pairs is changed to the structures as described in FIGS. 6A-B. In some instances, the design in FIG. 3B can also be extended in the same way the FIG. 3A structure is extended to FIG. 6A-B structures. However, in some instances, only the bottom SIL1-FGL1 pair can be changed this way.

The design in FIG. 3C can be modified as shown in FIG. 6C where both STO can have the FGL-SIL sequence reversed. In some instances, there also can be cases where FGL is sandwiched between two SILs. Further, FIG. 6D can include a combination of FIGS. 6B and 6C.

In a first example embodiment, a spin transfer torque assisted write head is provided. The spin transfer torque assisted write head can include a main pole (e.g., 102) configured to obtain a current flow and generate a first magnetic field to interact with a magnetic recording medium (e.g., 112).

The spin transfer torque assisted write head can also include a trailing shield (e.g., 110) and a spin torque device (e.g., 300A) disposed in a write gap portion between the main pole and the trailing shield. The spin torque device can include at least two spin torque oscillators (STOs). An example STO can be shown at 104 in FIG. 1. Further, 300A illustrates an example spin torque device with two STOs.

Each STO can include a magnetic field generation layer (FGL) layer (e.g., 308A, 316A) and a magnetic spin injection layer (SIL) layer (e.g., 304A, 312A). For instance, an STO can include SIL1 304A and FGL1 308A. Mutual spin transfer torques can be configured to be enabled between adjacent layers in the spin torque device. The FGL layers for each of the at least two STOs can be configured to be driven into an angle oscillation as a result of the mutual spin transfer torques, with the angle oscillation forming a second magnetic field to assist in writing at the main pole.

In some instances, each FGL includes a magnetic moment of between 8-20 nano meters times tesla (nmT), and each SIL includes a magnetic moment of between 1-4 nmT.

In some instances, a direct current bias current is configured to flow (e.g., generated by DC source 114) from the trailing shield to the main pole via the spin torque device.

In some instances, each STO further comprises a non-magnetic spacer (e.g., spacer 306A, 314A) disposed between the FGL and the SIL. The non-magnetic spacer can include a spin diffusion length greater than a thickness of the non-magnetic spacer.

In some instances, a stack of layers for the spin torque device between the main pole and trailing shield includes: the main pole/a first spin sink/a first SIL/a first spacer/a first FGL/a second spin sink/a second SIL/a second spacer/a second FGL/a third spin sink/the trailing shield. An example of this layer stack can be shown in FIG. 3A.

In some instances, a stack of layers for the spin torque device between the main pole and trailing shield includes: the main pole/a first spin sink/a first SIL/a first spacer/a first FGL/a second spin sink/a second SIL/a second spacer/a second FGL/a third spacer/a third SIL layer/the trailing shield. An example of this layer stack can be shown in FIG. 3B.

In some instances, a stack of layers for the spin torque device between the main pole and trailing shield includes: the main pole/a first spin sink/a first SIL/a first spacer/a first FGL/a second spin sink/a second FGL/a second spacer/a second SIL/a third spin sink/the trailing shield. An example of this layer stack can be shown in FIG. 3C.

In some instances, a stack of layers for the spin torque device between the main pole and trailing shield includes: the main pole/a first spin sink/a first FGL/a first spacer/a first SIL/a second spin sink/a second FGL/a second spacer/a second SIL/a third spin sink/the trailing shield. An example of this layer stack can be shown in FIG. 5A.

In some instances, a stack of layers for the spin torque device between the main pole and trailing shield includes: the main pole/a first SIL/a first spacer/a first FGL/a second spacer/a second SIL/a first spin sink/a second FGL/a third spacer/a third SIL/a second spin sink/the trailing shield. An example of this layer stack can be shown in FIG. 5B.

In some instances, a stack of layers for the spin torque device between the main pole and trailing shield includes: the main pole/a first spin sink/a first SIL/a first spacer/a first FGL/a second spacer/a second SIL/a second spin sink/a third SIL/a second FGL/a third spacer/a fourth SIL/a third spin sink/the trailing shield. An example of this layer stack can be shown in FIG. 6B.

In another example embodiment, a device is provided. The device can include a main pole, a trailing shield, and a spin torque device disposed in a write gap portion between the main pole and the trailing shield.

The spin torque device can comprise at least two spin torque oscillators (STOs). Each STO can include a magnetic field generation layer (FGL) layer and a magnetic spin injection layer (SIL) layer. Mutual spin transfer torques can be enabled between adjacent layers in the spin torque device, and the FGL layers for each of the at least two STOs can be driven into an angle oscillation as a result of the mutual spin transfer torques.

In some instances, a direct current (DC) current source is configured to generate a DC bias current configured to flow from the trailing shield to the main pole via the spin torque device.

In some instances, each STO further comprises a non-magnetic spacer disposed between the FGL and the SIL. The non-magnetic spacer can include a spin diffusion length greater than a thickness of the non-magnetic spacer.

In some instances, any of the STOs comprises the SIL layer coupled to any of the MP or the TS.

In some instances, any of the STOs include FGL and SIL layers configured to output a negative spin polarization. An example of the STOs configured to output a negative spin polarization can be shown in any of FIGS. 5A-C.

In some instances, a stack of layers for the spin torque device between the main pole and trailing shield includes: the main pole/a first spin sink/a first SIL/a first spacer/a first FGL/a second spin sink/a second SIL/a second spacer/a second FGL/a third spin sink/the trailing shield.

In another example embodiment, a method is provided. The method can include providing a device. The device can include a main pole (MP), a trailing shield (TS), and a spin torque device disposed between the MP and the TS. The spin torque device can include at least two spin torque oscillators (STOs). Each of the STOs can include a magnetic field generation layer (FGL) layer and a magnetic spin injection layer (SIL) layer.

The method can also include generating, by a direct current (DC) source, a DC current flow along an electrical path between the MP and TS via the spin torque device. The MP can generate a first magnetic field for interacting with a magnetic recording medium. Further, mutual spin transfer torques are enabled between adjacent layers in the spin torque device, the FGL layers for each of the at least two STOs are driven into an angle oscillation forming a second magnetic field to assist in writing at the main pole.

In some instances, each STO further comprises a non-magnetic spacer disposed between the FGL and the SIL, wherein the non-magnetic spacer includes a spin diffusion length greater than a thickness of the non-magnetic spacer.

In some instances, any of the STOs comprises the SIL layer coupled to any of the MP or the TS. For example, in FIG. 5B, the cSIL1*a* 520 can be disposed adjacent to a main pole.

In some instances, a stack of layers for the spin torque device between the main pole and trailing shield includes: the main pole/a first spin sink/a first SIL/a first spacer/a first FGL/a second spin sink/a second SIL/a second spacer/a second FGL/a third spin sink/the trailing shield.

It will be understood that terms such as “top,” “bottom,” “above,” “below,” and x-direction, y-direction, and z-direction as used herein as terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term “present invention” as used herein should not be construed to mean that only a single invention having a single essential element or group of elements is presented. Similarly, it will also be appreciated that the term “present invention” encompasses a number of separate innovations, which can each be considered separate inventions. Although the present invention has been described in detail with regards to the preferred embodiments and drawings thereof, it should be apparent to those skilled in the art that various adaptations and modifications of embodiments of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A method for manufacturing a spin transfer torque assisted write head, the method comprising:
- providing a main pole;
- providing a trailing shield; and
- disposing a spin torque device in a write gap portion between the main pole and the trailing shield, the spin torque device including:
  - a first non-magnetic spin sink adjacent to the main pole;
  - a first magnetic spin injection layer (SIL) layer between the non-magnetic spin sink and a first non-magnetic spacer;
  - a first magnetic field generation layer (FGL) layer adjacent to the first non-magnetic spacer;
  - a second non-magnetic spin sink disposed between the first FGL layer and a second SIL layer;
  - a second non-magnetic spacer disposed adjacent to the second SIL layer;
  - a second FGL layer adjacent to the second non-magnetic spacer; and
  - a third non-magnetic spin sink disposed between the second FGL layer and the trailing shield.

2. The method of claim 1, wherein the first non-magnetic spacer includes a spin diffusion length greater than a thickness of the first non-magnetic spacer.

3. The method of claim 1, wherein the first FGL layer and the second FGL layer oscillate in a same frequency and oscillate out of phase with one another.

4. The method of claim 1, wherein mutual spin transfer torques are configured to be enabled between adjacent layers in the spin torque device, and wherein the first FGL layer and the second FGL layer are configured to be driven into an angle oscillation as a result of the mutual spin transfer torques, with the angle oscillation forming a second magnetic field to assist in writing at the main pole.

5. The method of claim 1, wherein the first non-magnetic spin sink adjacent to the main pole includes a spin diffusion length less than a thickness of the first non-magnetic spin sink.

6. The method of claim 1, wherein each FGL layer includes a magnetic moment of between 8-20 nanometers times tesla (nmT), and each SIL layer includes a magnetic moment of between 1-4 nmT.

7. The method of claim 1, wherein a direct current bias current is configured to flow from the trailing shield to the main pole via the spin torque device.

8. A write head comprising:
- a main pole;
- a trailing shield; and
- a spin torque device disposed in a write gap portion between the main pole and the trailing shield, the spin torque device including:
  - a first non-magnetic spin sink adjacent to the main pole;
  - a first magnetic spin injection layer (SIL) layer between the non-magnetic spin sink and a first non-magnetic spacer;
  - a first magnetic field generation layer (FGL) layer adjacent to the first non-magnetic spacer;
  - a second non-magnetic spin sink disposed between the first FGL layer and a second SIL layer;
  - a second non-magnetic spacer disposed adjacent to the second SIL layer;
  - a second FGL layer adjacent to the second non-magnetic spacer; and
  - a third non-magnetic spin sink disposed between the second FGL layer and the trailing shield.

9. The write head of claim 8, wherein the first non-magnetic spacer includes a spin diffusion length greater than a thickness of the first non-magnetic spacer.

10. The write head of claim 8, wherein the first FGL layer and the second FGL layer oscillate in a same frequency and oscillate out of phase with one another.

11. The write head of claim 8, wherein mutual spin transfer torques are configured to be enabled between adjacent layers in the spin torque device, and wherein the first FGL layer and the second FGL layer are configured to be driven into an angle oscillation as a result of the mutual spin transfer torques, with the angle oscillation forming a second magnetic field to assist in writing at the main pole.

12. The write head of claim 8, wherein the first non-magnetic spin sink adjacent to the main pole includes a spin diffusion length less than a thickness of the first non-magnetic spin sink.

13. The write head of claim 8, wherein each FGL layer includes a magnetic moment of between 8-20 nanometers times tesla (nmT), and each SIL layer includes a magnetic moment of between 1-4 nmT.

14. The write head of claim 8, wherein a direct current (DC) current source is configured to generate a DC bias current configured to flow from the trailing shield to the main pole via the spin torque device.

15. The write head of claim 8, wherein the spin torque device includes the FGL and the SIL layers configured to output a negative spin polarization.

16. A spin torque device configured to be disposed between a main pole and a trailing shield, the spin torque device comprising:
- a first non-magnetic spin sink adjacent to the main pole;
- a first magnetic spin injection layer (SIL) layer between the non-magnetic spin sink and a first non-magnetic spacer;
- a first magnetic field generation layer (FGL) layer adjacent to the first non-magnetic spacer;
- a second non-magnetic spin sink disposed between the first FGL layer and a second SIL layer;
- a second non-magnetic spacer disposed adjacent to the second SIL layer;
- a second FGL layer adjacent to the second non-magnetic spacer; and
- a third non-magnetic spin sink disposed between the second FGL layer and the trailing shield.

17. The spin torque device of claim 16, wherein the first FGL layer and the second FGL layer oscillate in a same frequency and oscillate out of phase with one another.

18. The spin torque device of claim 16, wherein mutual spin transfer torques are configured to be enabled between adjacent layers in the spin torque device, and wherein the first FGL layer and the second FGL layer are configured to be driven into an angle oscillation as a result of the mutual spin transfer torques, with the angle oscillation forming a second magnetic field to assist in writing at the main pole.

19. The spin torque device of claim 16, wherein each FGL layer includes a magnetic moment of between 8-20 nanometers times tesla (nmT), and each SIL layer includes a magnetic moment of between 1-4 nmT.

20. The spin torque device of claim 16, wherein the FGL and the SIL layers are configured to output a negative spin polarization.

* * * * *